United States Patent Office 3,246,454
Patented Apr. 19, 1966

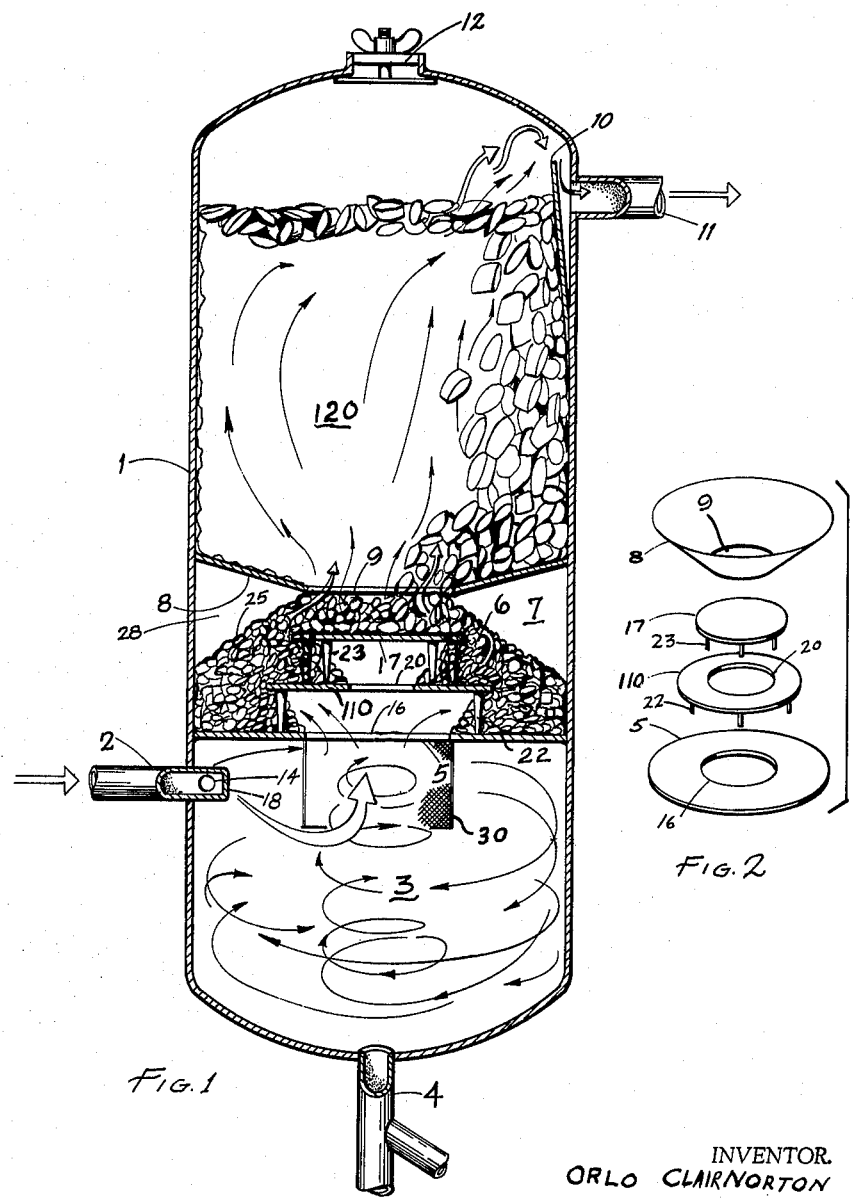

3,246,454
GAS DRIER
Orlo Clair Norton, Erie, Pa., assignor to Van Products Company, Erie, Pa., a corporation of Pennsylvania
Filed Mar. 1, 1962, Ser. No. 176,665
6 Claims. (Cl. 55—316)

This invention relates to air driers and, more particularly, to the type of driers known as deliquescent air driers.

Air driers made according to previous inventions had a desiccant bed supported on a single screen which held the desiccant in a bed of a single layer. Air passing through this bed was inclined to make chimneys or channels through the single layer bed so that much of the main air stream could pass through the chimneys and much of the air did not come in contact with the desiccant.

In the present invention, the desiccant is supported on baffles arranged as several vertically spaced shelves, the upper shelves being smaller in size than the lower shelves with a large shelf open at the center above them. Thus, the pellets of desiccant reduced in size by dissolving of their surface fall to the bottom, thus reducing the tendency for chimneys to form.

It is, accordingly, an object of the present invention to provide an improved air drier.

Another object of the invention is to provide an air drier which is simple in construction, economical to manufacture, and simple and efficient to use.

A further object of the invention is to provide an air drier wherein the desiccant is supported on two spaced shelves having center openings with two spaced smaller shelves therebetween.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a longitudinal cross sectional view of a drier according to the invention; and FIG. 2 is an exploded view of the baffles used in the air drier shown in FIG. 1.

Now with more particular reference to the drawing, the air drier is made up generally of a hollow tank 1 having an inlet pipe 2 and an outlet pipe 11. The inlet pipe 2 is closed at its inward end at 18 and has a lateral opening 14 therein which allows the air to enter a separating chamber 3 of the tank from the pipe 2 at a path tangential to the inside of the tank, thus removing some of the entrained water by centrifugal action.

A plate like baffle 10 is spaced over the outlet pipe 11 so that the air must pass around the top of the baffle as indicated by the arrow and thus not carry desiccant out with the escaping air.

Baffles 5 and 8 are welded to the inside of the tank 1. The baffle 5 is in the form of a generally flat disk having an opening 16 at the center. The upper baffle 8 is spaced with an equalizing chamber 7 therebetween above the lower baffle 5 as shown. The baffle 8 has the form of an inverted frustum of a cone having an opening 9 in its center generally in alignment with the opening 16 in the baffle 5. The opening 16 in baffle 5 may be considerably larger than the opening 9.

A baffle 110 is in the form of a disk having an opening 20 at the center and it is supported on the baffle 5 by means of legs 22. A baffle 17 is in the form of a flat disk having legs 23 supporting it on the baffle 110. The legs 22 and 23 may be welded or they could be attached to the other baffles in any suitable manner.

The large desiccant particles are supported on the baffle 8 and as they are dissolved by moisture from the air to form fine pellets, they run down through the center opening 20 onto the baffle 110. The angle of repose of the fine desiccant bed 6 allows the pellets to run out as shown to the outside edge of the tank 1. It will be noticed that the fine particles of desiccant run inward adjacent the inner edge of the opening 16 at an angle determined by the angle of repose of the material and, in like manner, they run inward under the baffle 17.

Air entering the tank 1 to the inlet pipe 2 swirls tangentially around the separating chamber 3 and, at this point, liquid, water, and oil are removed therefrom by centrifugal action in the separating chamber 3.

The air then rises through the center baffle 5 through the opening 16 therein and the fine desiccant in the bed 6 which has had its size reduced by moisture from the air comes in contact with the air. Moisture in the air is absorbed by the desiccant and the solution formed thereby runs down into a drain pipe 4. The air then flows up through the equalizing chamber 7 and then passes through the opening 9 in the baffle 8 into a coarse desiccant bed 120 where moisture is further reduced and where the particles are still large, not having been dissolved.

After passing through the desiccant bed in the upper chamber, air passes over the restricted opening above the baffle 110 and through the outlet pipe 11. A filler opening 12 allows the operator to recharge desiccant into the drier. Due to the small particle size in the desiccant bed 6, the desiccant will flow through the opening 9 and form a bed 6 of fine pellets. This flow of pellets helps keep pellets in the path of air. Thus, the upper chamber fills the bed 6 to a uniform predetermined thickness and as the size of the desiccant particles above the baffle 8 decreases, they flow down through the opening 9 into the equalizing chamber. A screen 30 in the form of an open cylinder is attached to the lower baffle around the opening.

The particles above the baffle 8 may be in the order of one-half inch to one inch in length and about one-half inch in diameter. They can be made of calcium chloride supported on some porous soluble material.

The foregoing specification sets forth the invention in its preferred practical forms but the structure shown is capable of modification within a range of equivalents without departing from the spirit thereof or from the scope of the appended claims.

The embodiments of the invention in which an exclusive property or privilege is claimed are defined as follows:

1. An air drier comprising a tank having an inlet at the bottom and an outlet at the top thereof, an upper generally horizontally oriented baffle and a lower generally horizontally oriented baffle spaced downwardly from said upper baffle at an intermediate part of said tank with an equalizing chamber therebetween, each of said upper and lower baffles being supported with its outer periphery in engagement with the inner periphery of said tank, and each having a generally centrally oriented vertically extending opening therethrough substantially aligned with one another, a first generally horizontally oriented intermediate baffle disposed between said upper and lower baffles and spaced from the inner periphery of said tank, said first intermediate baffle being imperforate and extending horizontally slightly beyond and completely overlapping said opening in said upper baffle, a second intermediate baffle positioned between and spaced from said first intermediate baffle and said lower baffle, and a bed of pellets of a deliquescent material supported on said baffles, said baffles and said tank being so constructed and arranged to provide for gravity flow of said pellets supported on said upper baffle through said opening in said upper baffle onto said intermediate baffles and outward at an angle of repose and onto to be supported by said lower baffle in said equalizing chamber.

2. An air drier in accordance with claim 1 wherein said second intermediate baffle comprises a plate-like member spaced from the interior surface of said tank and having a generally vertically extending centrally located opening therethrough.

3. An air drier in accordance with claim 2 wherein said opening in said second intermediate baffle is smaller than said opening in said lower baffle and is disposed in generally axial alignment therewith, said upper baffle being in the form of an inverted frustum of a cone having its top open.

4. An air drier in accordance with claim 1 wherein said inlet is in the form of a generally horizontally extending pipe having its inner end closed, a side of said pipe having an opening therein for directing inlet air generally tangentially into the interior of the tank, said inlet being disposed above the bottom of said tank.

5. An air drier recited in claim 1 wherein said outlet comprises an opening in the side of said tank and a plate over said opening and spaced inwardly therefrom.

6. An air drier recited in claim 1 wherein an open ended cylindrical screen is attached in depending relation to said lower baffle around said opening therein.

References Cited by the Examiner
UNITED STATES PATENTS

| | | | |
|---|---|---|---|
| 1,376,691 | 5/1921 | Hartman | 55—316 X |
| 1,987,768 | 10/1934 | Skinner | 55—446 X |
| 2,001,259 | 5/1935 | Lucke | 55—30 |
| 2,044,421 | 6/1936 | Cooke | 55—446 X |
| 2,197,595 | 4/1940 | Schneible | 55—446 X |
| 2,642,951 | 6/1953 | Norton | 55—267 |
| 2,709,580 | 5/1955 | Kameya | 261—111 |

FOREIGN PATENTS

| | | |
|---|---|---|
| 720,160 | 12/1954 | Great Britain. |

REUBEN FRIEDMAN, *Primary Examiner.*

HARRY B. THORNTON, *Examiner.*